(12) United States Patent
Bugenhagen

(10) Patent No.: US 8,625,439 B2
(45) Date of Patent: *Jan. 7, 2014

(54) SYSTEM AND METHOD FOR COMMUNICATING ALARMS BETWEEN DEVICES OF A PACKET NETWORK

(75) Inventor: Michael Bugenhagen, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/094,433

(22) Filed: Apr. 26, 2011

(65) Prior Publication Data

US 2011/0199912 A1    Aug. 18, 2011

Related U.S. Application Data

(63) Continuation of application No. 12/323,804, filed on Nov. 26, 2008, now Pat. No. 7,957,299.

(60) Provisional application No. 61/082,138, filed on Jul. 18, 2008.

(51) Int. Cl.
    *H04L 12/26* (2006.01)
(52) U.S. Cl.
    USPC .......................................... 370/245; 370/248
(58) Field of Classification Search
    None
    See application file for complete search history.

(56) References Cited

U.S. PATENT DOCUMENTS

| | | | |
|---|---|---|---|
| 5,946,373 A | 8/1999 | Harris | |
| 6,301,337 B1 | 10/2001 | Scholtz et al. | |
| 6,819,745 B2 | 11/2004 | Hollenbeck et al. | |
| 7,957,299 B2 * | 6/2011 | Bugenhagen | 370/245 |
| 8,054,751 B2 * | 11/2011 | Elie-Dit-Cosaque et al. | 370/241.1 |
| 2001/0046212 A1 | 11/2001 | Nakajima | |
| 2003/0039207 A1 | 2/2003 | Maeda et al. | |
| 2004/0008988 A1 | 1/2004 | Gerstal et al. | |
| 2004/0170128 A1 | 9/2004 | Takamichi | |
| 2005/0099954 A1 | 5/2005 | Mohan et al. | |
| 2005/0099955 A1 | 5/2005 | Mohan et al. | |
| 2005/0122908 A1 | 6/2005 | Soumiya et al. | |
| 2005/0249119 A1 | 11/2005 | Elie-Dit-Cosaque et al. | |
| 2006/0031482 A1 * | 2/2006 | Mohan et al. | 709/224 |
| 2006/0126503 A1 | 6/2006 | Huck et al. | |
| 2007/0097857 A1 * | 5/2007 | Zhai | 370/218 |
| 2007/0230358 A1 | 10/2007 | Narayanan et al. | |
| 2008/0019363 A1 | 1/2008 | Kitajima | |
| 2008/0172497 A1 * | 7/2008 | Mohan et al. | 709/249 |
| 2009/0161562 A1 | 6/2009 | Shah et al. | |

OTHER PUBLICATIONS

Fluke Networks, "Telecom Text Equipment, Fluke Networks TS 1200 ADSL Test Set", 2 pgs., Tecra Tools, Inc. 2007.
Fluke Networks, "TS® 1200 ADSL/POTS Test Set", 2 pgs., Aug. 11, 2008.
Fluke Networks, "TS ® 1200 ADSL/POTS Test Set, Datasheet and Literature", 9 pgs. Aug. 8, 2008.

* cited by examiner

*Primary Examiner* — Min Jung
(74) *Attorney, Agent, or Firm* — Patton Boggs LLP

(57) ABSTRACT

A system and method for communicating failures in a metro Ethernet network (MEN). Packets are communicated through multiple maintenance entities. A determination is made that there is a failure between or at one of the multiple maintenance entities. An alarm is generated at a maintenance entity nearest the failure in response to determining there is a failure. The alarm indicates a location of the failure. The alarm is communicated back through one or more of the multiple maintenance entities to a maintenance end point. The alarm is routed at least two a communications service provider determined to be associated with the failure.

20 Claims, 2 Drawing Sheets

SYSTEM AND METHOD FOR COMMUNICATING ALARMS BETWEEN DEVICES OF A PACKET NETWORK

CROSS-REFERENCE TO RELATED APPLICATIONS

This application is a continuation application of pending application Ser. No. 12/323,804 filed on Nov. 26, 2008 now U.S. Pat. No. 7,957,299 which claims priority to provisional application Ser. No. 61/082,138, filed on Jul. 18, 2008. The entire contents of which are hereby incorporated by reference in their entirety.

This application incorporates by reference utility application Ser. No. 11/809,885, filed on May 31, 2007, entitled: System and Method for Routing Communications Between Packet Networks Based on Intercarrier Agreements.

BACKGROUND OF THE INVENTION

The Ethernet protocol is rapidly growing as a communications protocol between different service providers. The T1 standard is reliable because there is a known bit rate and if there are deviations, performance problems are easily verified using the end points and loop around functions, the T1 protocol may also use an alarm indicator signal or state that may be passed to every circuit path segment from end to end to indicate far end and near end fault detection. Because Ethernet protocol is non-synchronous, determining or communicating performance statistics and alarms for each segment of a connection or specific devices may be difficult.

BRIEF SUMMARY OF THE INVENTION

One embodiment provides a system and method for communicating failures in a metro Ethernet network (MEN). Packets may be communicated through multiple maintenance entities. A determination may be made that there is a failure between or at one of the multiple maintenance entities. An alarm may be generated at a maintenance entity nearest the failure in response to determining there is a failure. The alarm may indicate a location of the failure. The alarm may be communicated back through one or more of the multiple maintenance entities to a maintenance end point. The alarm may be routed at least two a communications service provider determined to be associated with the failure.

Another embodiments provides a system for communicating alarms. The system may include a metro-Ethernet network for communicating packets. The system may also include a multiple maintenance entities. Each of the multiple maintenance entities is operable to determine there is a failure between or at one of the plurality of maintenance entities, generate an alarm at a maintenance entity nearest the failure in response to determining there is a failure, the alarm indicates a location of the failure, and communicate the alarm back through one or more of the multiple maintenance entities to a maintenance end point. The alarm is routed at least two a communications service provider determined to be associated with the failure.

Another embodiment provides a maintenance entity. The maintenance entity may include a processor for executing a set of instructions and a memory operable to store the set of instructions. The set of instructions may be executed to communicate packets as part of a communications path, the communications path may include multiple maintenance entities, determine there is a failure at maintenance entities in direct communication with the maintenance entity or between the maintenance entities and the maintenance entity; generate an alarm at the maintenance entity in response to determining there is a failure, the alarm may indicate a location of the failure; and communicate the alarm back through one or more of the plurality of maintenance entities to a maintenance end point, wherein the alarm is routed at least two a communications service provider determined to be associated with the failure.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

One or more of the illustrative embodiments provide a system and method for sending an alarm indicator signal (AIS) from one maintenance entity (ME) operation administration and maintenance (OAM) group to another to communicate the location and type of a fault. In one embodiment, the illustrative embodiments may be implemented for a metro Ethernet network (MEN). The AIS is a coded signal that is sent to network devices and elements to indicate a problem state or that a failure has been detected and an alarm generated. The AIS may be passed from one ME to another using domain state stitching or associating the AIS states of two or more ME or OAM levels so that the AIS signal from one ME may be communicated to the associated ME via a coded signal. One embodiment of the coded signal is a time length value (TLV) field of the Ethernet OAM protocols. State sharing or stitching may occur across multiple ME domains whereby an AIS signal from a distant customer or provider may be communicated over multiple service provider ME domains to the far end which may be owned by the customer or provider. As a result, the originating AIS state may be passed back to the customer or provider for fault isolation.

The location of the problem, issue, or failure may be determined based on the end-point or ME that generated the original AIS. For example, the next in a chain of MEs may be determined to be the failure point. One or more of the illustrative embodiments may provide a protocol for ensuring that the appropriate service provider is contacted to diagnose and fix a problem rather than requiring any number of functioning service providers to unnecessarily troubleshoot their individual systems. As a result, any number of customers or service providers may be able to determine a point of origination or location of performance issues and alarms in one or more networks.

A user-to-network (UNI) network is the physical and electrical demarcation point between the user and the public network service provider, typically a MEN and customer premises equipment. Typically, any layer 2 maintenance entity or maintenance association includes two or more end points, generally referred to as maintenance end points (MEP). AIS are alerts that provide information regarding information, such as performance and state of ports, layer 2 paths, operational status, and network element status. For example, the AIS may indicate there is no power throughout the MEN. Illustrative embodiments provide an efficient system for passing AIS between groups of MEs or specific domains. The AIS indication itself may be augmented with other TLV data to identify the type or location of an ME triggering an alarm based on a problem.

Figure 1:
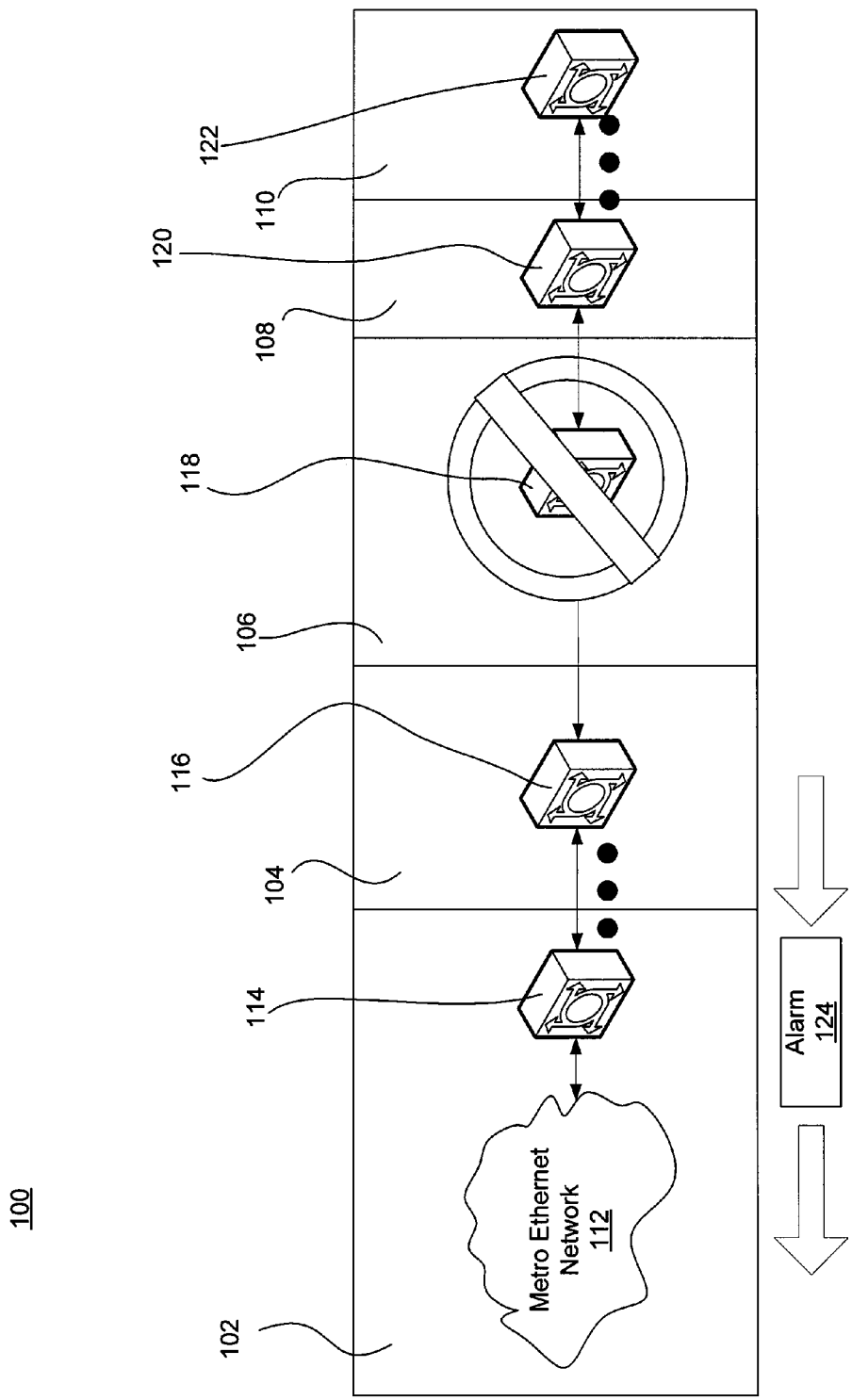
FIG. 1 is a pictorial representation of a communications environment in accordance with an illustrative embodiment.

FIG. 1 is a pictorial representation of a communications environment in accordance with an illustrative embodiment. FIG. 1 illustrates one embodiment of a communications environment 100. The communications environment 100 is the devices, equipment, and systems for enabling communications. In particular, the communications environment may be one or more MENs and systems. The communications environment 100 may include any number of devices, equipment, systems, elements, and components. In one embodiment, the communications environment 100 may include segments 102, 104, 106, 108, and 110, a MEN 112, ME 114, 116, 118, 120, and 122, and alarm 124.

The communications environment 100 and the MEN 112 may include various MEs 114, 116, 118, 120, and 122, MEP, service network interfaces (SNI), network interface devices, Ethernet to External Network to Network Interface (E-NNI), and other elements as described in the patent application herein incorporated. Communications may occur between any number of entities, including the MEs 114, 116, 118, 120, and 122 and may communicate with the MEN 112 in any number of configurations. Alternatively, the MEs 114, 116, 118, 120 and 122 may be considered part of the MEN 112. In one embodiment, an SNI may be connected to the MEN 112 and may perform conversion of transmission protocols and standards, such as from Ethernet to synchronous optical network (SONET). In another embodiment, a UNI may be connected directly to the MEN 112. In yet another embodiment, the user may connect to the MEN 112 or to another portion of the communications environment 100 through one or more service providers, segments, or territories.

The segments 102, 104, 106, 108, and 110 are portions of the communications environment 100 and may represent communications paths and routes utilized for data communications. The segments 102, 104, 106, 108, and 110 may be operated by one or more communications service providers, users, entities, or other operators. Each segment 102, 104, 106, 108, and 110 may include multiple nodes, domains, entities, devices, systems, equipment, controllers, connections, and other communications elements. The segments 102, 104, 106, 108, and 110 may also represent ME domains/pairs.

In one embodiment, the domains or entities of the communications environment 100 may include the MEN level of the service provider, an access segment outside of the ME, and a customer UNI ME. In another embodiment, the communications environment 100 may only include two segments, such as connections between the customer, a local service provider, and the access service provider. In one embodiment, each of the segments 102, 104, 106, 108, and 110 may operate without knowledge of the other segments 102, 104, 106, 108, and 110.

The illustrative embodiments may allow the MEs to send AIS or alarm 124 based on failures or problems at or between the MEs 114, 116, 118, 120, 122. In one embodiment, the ME 118 has failed. The AIS may allow one or more parties to determine which ME or segment is or has failed or is experiencing or has experienced problems. For example, the ME 116 may communicate with the applicable MEP which may be ME 114 indicating that the failure has occurred at ME 118 or the connection between ME 116 and 188. On the other side, the ME 120 may similarly notify the ME 122 from the other communications direction.

In another example a first ME pair includes MEs 116 and 120, with a second ME pair including MEs 120 and 122. If a power outage were to occur in ME 122 the second ME pair may indicate a failure of the layer two path and that the second ME pair may then trigger an AIS indication. The AIS indication may or may not contain the cause of the AIS failure. When the two AIS states of the first ME pair and second ME pair are "stitched" or shared, the AIS indication at ME 120 may be conveyed to the first ME pair which may then propagate the AIS conditional alarm with the originating ME pair identification to ME 116.

The failure determination may be triggered by the OAM performance threshold criteria or by traditional port state operational measurements, such as "LOS" for loss of signal. MEs 114, 116, 118, 120, 122 may communicate information via a TLV field. The illustrative embodiments may provide a signaling protocol and method for passing the AIS state of one ME to another. If both MEs terminate in the same node, the AIS state may be associated from one ME to the other ME via standard operational measures reading and state information. For example, the AIS may be generated by the ME 116 and may be communicated to one or more other domains, entities, or back to the ME 114 and MEN 112. The AIS may be a special state alarm that uses a special frame to alarm the AIS condition. For example, a remote defect indicator (RDI) may communicate faults to an MEP at a far end. In one embodiment, the AIS and remote defect indicator packets of the illustrative embodiments may utilize standards, recommendations, or protocols, such as ITU-T Recommendation Y.1731 (05/2006). One or more of the illustrative embodiments may allow an AIS signal to be sent downstream to the other end indicating that the ME 118, access connection, UNI port, or other network element has a failure or error. For example, if a customer experiences a power outage, the ME 116 sends the alarm 124 to the other end of the communications environment indicating that there is a power outage or other problem at the ME 118. The AIS may be utilized to report the state at each end of an ME and the RDI may communicate the state and AIS inside of an ME segment or pair. Both types of state information may be stitched together.

The alarm 124 may be any number of signals and alarm types. In one embodiment, a UNI directional frame loss alarm may indicate that data is destined for the ME 120, but is not being received properly by the ME 120. A continuity check packet alarm may indicate that the ME 120 or MEP is unable to hear or verify the presence or status of the far end which may include the ME 114 or the MEN 112. The illustrative embodiment allows a problem to be identified between any number of coupled MEs. It is important to note that both point-to-point and multipoint-to-multipoint AIS alarm indications may be passed between respective yet different ME types. TLV field characterizations may indicate where the fault or alarm originated.

In one embodiment, the AIS may not diagnose the error or failure, but rather may locate the failure connection, node, or point. As a result, the proper service provider, operator, or customer may be alerted right away once an AIS is activated and sent back downstream. As a result, service providers may correctly identify the location of the problem to prevent the unnecessary use of resources. In one embodiment, MEP servers utilize notification engines, such as simple network management protocol (SNMP) to notify the appropriate service provider of the alarm and a suggested corrective action. For example, the ME 116 and corresponding connection to the ME 114 may not be tested for faults or problems when ME 118 has already been identified as failing due to loss of power. In one or more of the illustrative embodiments, an AIS, once generated, is passed or flipped from the last functioning ME to another back to the MEP. For example, the ME 120 may communicate the AIS back to the ME 122 which may be a MEP. In particular, the AIS may be passed to endpoints within the communications environment ensuring that fault location information may be retrieved from the endpoint devices. In another embodiment, the AIS fault or problem location may also be retrieved from the intermediary MEs, nodes, domains, entities, or other parts of the communications environment 100. AIS stitching may be utilized between associated MEs within the communications environment 100.

Figure 2:
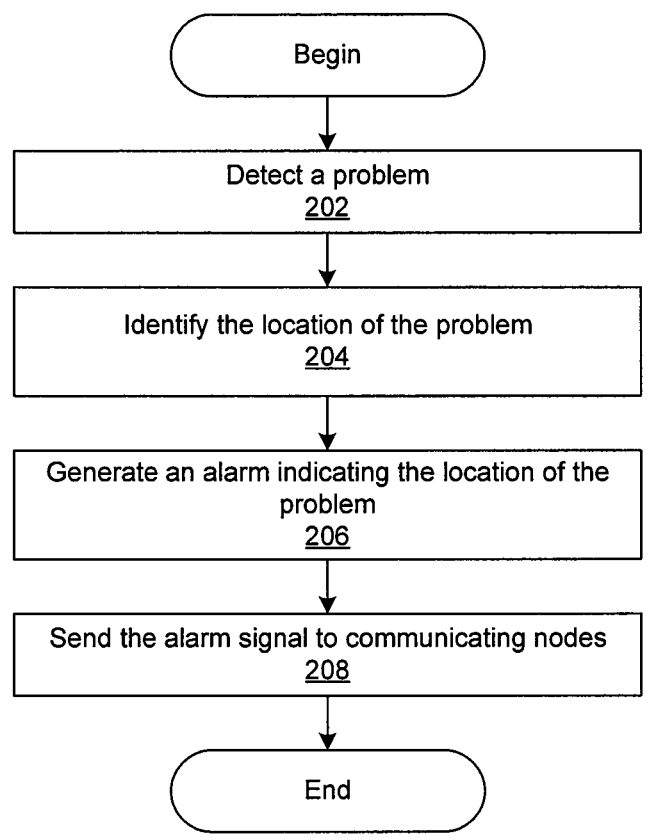
FIG. 2 is a flowchart of a process for detecting network problems in accordance with an illustrative embodiment.

FIG. 2 is a flowchart of a process for detecting network problems in accordance with an illustrative embodiment. The process may be implemented by one or more MEs within a metro Ethernet environment, system, or network. The process may begin by detecting a problem (step 202). The problem may be a problem, failure, or other issue that affects communications at or between MEPs within a MEN. In one embodiment, the problem may be detected by a functioning ME that determines a subsequent ME or data connection is unavailable.

Next, the ME identifies the location of the problem (step 204). The location may be identified utilizing a network identifier for a device, connection, or network segment. The network identifier may be a provider name, circuit identifier, ME association, MEP address, IP address, MAC address, assigned identifier, numeric sequence, or other information indicating the location of the device or connection that is experiencing the problem. As previously described, the last functioning ME in a series of MEs, domains, entities, or nodes may note the location. The network identifier may indicate the point at which packets or data are no longer able to proceed to the next ME, domain, or point. For example, by using AIS stitching between MEs, a fault may be more specifically identified, such as identifying frame loss that is occurring on the receive side of an ME and the identity of the last functioning ME.

Next, the ME generates an alarm indicating a location of the problem (step 206). The alarm or AIS may indicate the location of the problem utilizing the identifier or other information. The ME sends the alarm signal to the MEPs (step 208). The alarm signal may also be retrieved, read, or analyzed by any number of intermediary MEs operated by one or more communications service providers. In one embodiment, ME associations may be paired and multiple service providers may use sharing standards or protocols for sharing AIS or RDI signals between ME domains. As a result, each service provider may know where the problem is occurring so that actions, such as troubleshooting, dispatching technicians, or other similar steps may be taken by the service provider experiencing the failure. A network identifier or ME identification may indicate where the problem or failure is from one or more sides or perspectives of the network including near and a far end identification. In one embodiment, the alarms may be color coded or numbered errors that identify the error, failure, problem, or issue. The AIS may also specify the problem category. The categories may include physical, Ethernet first mile, operational administration measurement (OAM) and other categories for bad packets, level of service (LOS), loss of signal, power loss, packet loss, fragmented packets, frame loss ratio (FLR), delay, TLV (i.e., circuit ID), or state (in-service, out-of-service).

In one embodiment, performance metrics may not be necessary even though one or more of the illustrative embodiments may be implemented with a system that performs stitching for performance metrics. One or more of the illustrative embodiments may allow one or more MEs to generate or receive an alarm with the alarm state and identify the location of the alarm. One or more of the illustrative embodiments allows a communications service provider or operator to determine whether the source of the problem originates within equipment, systems devices, or connections managed by the service provider or whether the source of the problem is with a different provider/customer.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for communicating failures in a metro Ethernet network (MEN), the method comprising:
    communicating packets through a plurality of maintenance entities;
    determining there is a failure between or at one of the plurality of maintenance entities;
    generating an alarm at a maintenance entity nearest the failure in response to determining there is a failure, the alarm indicates a location of the failure and an identification of a communications service provider associated with the failure; and
    communicating the alarm indicating the location of the failure and the identification back through one or more of the plurality of maintenance entities to a maintenance end point, wherein the alarm is routed to at least the communications service provider determined to be associated with the failure indicating that the failure is the responsibility of the communications service provider.

2. The method according to claim 1, wherein the plurality of maintenance entities are associated with two or more communication service providers, and wherein each of the two or more communication service providers are notified of the alarm and the identification of the communications service provider determined to be associated with the failure to prevent unnecessary actions of communications service providers not associated with the failure.

3. The method according to claim 2, wherein the alarm is an alarm indicator signal (AIS), and wherein the communicating comprises:
    stitching the AIS between the one or more of the plurality of maintenance entities to a maintenance end point.

4. The method according to claim 3, wherein the AIS indicates a category of the alarm and a type of the alarm.

5. The method according to claim 1, further comprising:
    performing fault isolation utilizing the alarm received by the communications service provider determined to be associated with the failure.

6. The method according to claim 1, wherein a maintenance entity after a last functioning maintenance entity is determined to be a failing maintenance entity, and wherein only the communications service provider is contacted to fix the failure through the alarm.

7. The method according to claim 1, wherein the alarm stores information associated with the failure in a time length value field.

8. The method according to claim 1, wherein alarms indicating the location and the identification are generated and communicated back in a communications path of the MEN from both sides of the failure.

9. The method according to claim 1, wherein each of the plurality of maintenance entities is coupled with a second maintenance entity to determine the location of the failure.

10. The method according to claim 1, wherein the location indicates a point of failure in the MEN.

11. The method according to claim 10, wherein a network identifier specifies the location.

12. A system for communicating alarms comprising:
a metro Ethernet network (MEN) for communicating packets;
a plurality of maintenance entities, each of the plurality of maintenance entities is operable to:
determine there is a failure between or at one of the plurality of maintenance entities;
generate an alarm at a maintenance entity nearest the failure in response to determining there is a failure, the alarm indicates a location of the failure and an identification of a communications service provider associated with the failure; and
communicate the alarm indicating the location of the failure and the identification of the communications service provider back through one or more of the plurality of maintenance entities to a maintenance end point, wherein the alarm is routed to at least a communications service provider determined to be associated with the failure indicating that the failure is the responsibility of the communications service provider.

13. The system according to claim 12, wherein the plurality of maintenance entities generate and communicate alarms indicating the location and the identification in the MEN from both sides of the failure.

14. The system according to claim 12, wherein the alarm indicates a type of failure and a category of the failure, wherein the location includes a network identifier specifying the location of the failure, and, and wherein only the communications service provider is contacted from a plurality of communications service providers in the MEN to fix the failure through the alarm.

15. The system according to claim 12, wherein the plurality of maintenance entities are further operable to stitch information in the alarm between the plurality of maintenance entities and the MEP as part of an alarm indicator signal.

16. The system according to claim 12, wherein the plurality of maintenance entities are associated with two or more communication service providers, and wherein each of the two or more communication service providers are notified of the alarm and the identification of the communications service provider determined to be associated with the failure.

17. The system according to claim 12, wherein a maintenance entity after a last functioning maintenance entity is determined to be a failing maintenance entity.

18. A maintenance entity comprising:
a processor for executing a set of instructions;
a memory in communication with the processor, the memory operable to store the set of instructions, wherein the set of instructions are executed to:
communicate packets as part of a communications path, the communications path including a plurality of maintenance entities;
determine there is a failure at maintenance entities in direct communication with the maintenance entity or between the maintenance entities and the maintenance entity;
generate an alarm at the maintenance entity in response to determining there is a failure, the alarm indicates a location of the failure and an identification of a communications service provider associated with the failure; and
communicate the alarm back indicating the location of the failure and identification through one or more of the plurality of maintenance entities to a maintenance end point, wherein the alarm is routed to at least a communications service provider determined to be associated with the failure indicating that the failure is the responsibility of the communications service provider.

19. The maintenance entity according to claim 18, wherein the plurality of maintenance entities are associated with two or more communication service providers, and wherein each of the two or more communication service providers are notified of the alarm and identification of the communications service provider determined to be associated with the failure to prevent unnecessary actions of communications service providers not associated with the failure.

20. The maintenance entity according to claim 18, wherein alarms indicating the location and the identification are generated and communicated back in a communications path of the MEN from both sides of the failure, and wherein only the communications service provider is notified to fix the failure from a plurality of communications service providers in the MEN.

* * * * *